Oct. 16, 1951  W. L. O. GRAVES  2,571,708
REVERSING MAGNETIC AMPLIFIER CONTROL SYSTEM
Filed May 21, 1949

Inventor:
William L.O. Graves,
by  Claude A. Mott
His Attorney.

Patented Oct. 16, 1951

2,571,708

UNITED STATES PATENT OFFICE 2,571,708

REVERSING MAGNETIC AMPLIFIER CONTROL SYSTEM

William L. O. Graves, Schenectady, N. Y., assignor to General Electric Company, a corporation of New York Application May 21, 1949, Serial No. 94,612

5 Claims. (Cl. 321—25)

This invention relates to control systems, more particularly to control systems which include magnetic amplifiers as elements, and it has for an object the provision of a simple, reliable and improved control system of this character.

Still more particularly the invention relates to a system utilizing magnetic amplifiers for controlling reversing loads such as electric motors and it has for a further object the provision of a control system of the character described in which operating losses are reduced to a minimum.

In carrying the invention into effect in one form thereof, a source of alternating voltage is provided with a center tap. Two load circuit terminals are provided, the first of which is connected to the center tap. Two magnetic amplifiers are supplied from the source to provide forward and reverse operation. Each comprises a core structure that is provided with two reactance windings. One terminal of one of the windings is connected to one side of the source and a corresponding terminal of the other is connected to the opposite side of the source. The other terminals of the windings are connected through rectifiers and a resistor to the second load circuit terminal. Direct voltages of opposite polarity at the second load terminal are supplied to each of the resistors from a separate rectifier. A saturation control winding links the core structure of both amplifiers and the voltage at the output terminals is varied by varying the magnitude of the current in the control winding. The polarity of the output voltage is reversed by reversing the direction of current flow in the control winding.

Figure 1:
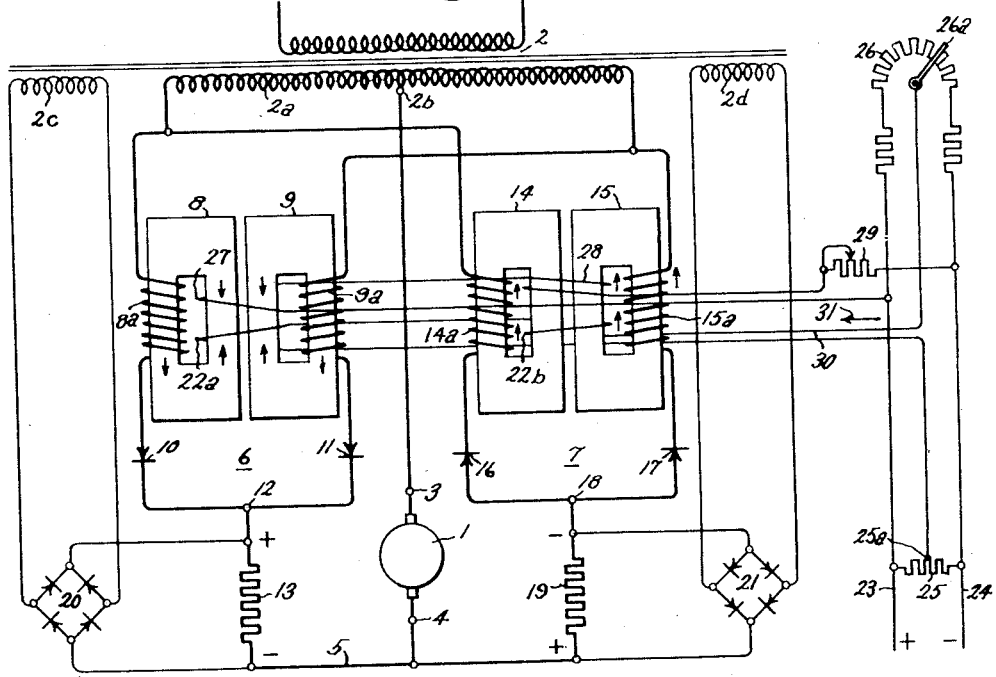
Figure 2:
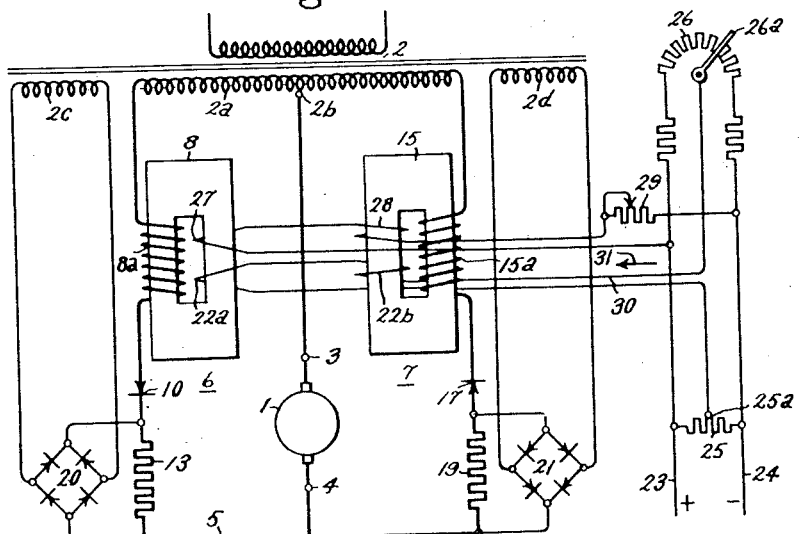

For a better and more complete understanding of the invention, reference should now be had to the following specification and to the accompanying drawing, of which Fig. 1 is a simple diagrammatical illustration of an embodiment of the invention and Fig. 2 is a modification.

Referring now to the drawing, a reversible load device, such as a D.-C. electric motor 1, is supplied from a suitable source of alternating voltage, such as represented by the main secondary winding 2a of a supply transformer 2.

The secondary winding is provided with a center tap 2b which is connected to a first output terminal 3. The second output terminal 4 is connected to a bus 5.

Between the secondary winding 2a and the bus 5 are connected two magnetic amplifiers 6 and 7. As shown, the magnetic amplifier 6 comprises a core structure which embodies two separate two-legged core members. These two members are separated by a small air gap.

On the outside leg of core member 8 is mounted a reactance winding 8a of which one terminal is connected to the left-hand terminal of the main secondary winding 2a. Similarly on the outside leg of core member 9 is mounted a reactance winding 9a of which one terminal is connected to the opposite or right-hand terminal of the secondary winding. The opposite terminals of the reactance windings are connected through rectifiers 10 and 11, respectively, to a common point 12 and from this point through a resistor 13 to the bus 5.

The magnetic amplifier 7 also comprises two core members 14 and 15 upon the outside legs of which are mounted two reactance windings 14a and 15a, of which the upper terminals are connected to the left and right-hand terminals, respectively, of the secondary winding 2a. The lower terminals of these windings are connected through rectifiers 16 and 17, respectively, to a common point 18 and thence through a resistor 19 to the bus 5.

It will be noted that the pair of rectifiers 10 and 11 and the pair of rectifiers 16 and 17 are oppositely poled with respect to the terminals of the secondary winding. The rectifiers 10, 11, 16 and 17 may be of any suitable type, such as the well known copper oxide rectifier or the selenium rectifier.

The transformer 2 is also provided with auxiliary secondary windings 2c and 2d. A full wave biphase rectifier 20 is supplied from the auxiliary secondary winding 2c and its output terminals are connected to supply to the resistor 13 a direct voltage, of which the polarity is positive at the terminal 12 and negative at the bus 5. The turn ratio of the auxiliary winding 2c to the primary winding is such that the direct voltage supplied to the resistor 13 is approximately equal to full voltage at the load terminals or approximately equal to one-half the voltage between either terminal of the main secondary winding and the center tap. A rectifier 21, which is similar to the rectifier 20, is supplied from the auxiliary secondary winding 2d and its output terminals are connected to supply to the resistor 19 a voltage of which the polarity is positive at the bus 5 and negative at the terminal 18. The magnitude of this direct voltage is equal to that of the voltage across resistor 13.

Linking the core structures of both amplifiers is a saturating control winding having a coil 22a which surrounds the two inner legs of core members 8 and 9 and a coil 22b which surrounds the two inner legs of core members 14 and 15. The two coils 22a and 22b are supplied with variable voltage which is derived from a suitable source of constant voltage, such as represented by the supply conductors 23 and 24. A resistor 25 and a potentiometer 26 are connected across the source 23 and 24. The saturating control winding coils 22a and 22b are connected in series relationship between the center tap 25a of resistor 25 and the slider 26a of potentiometer 26.

The magnetic amplifier is also provided with a bias winding which comprises a coil 27 and a coil 28 connected in series relationship across the supply conductors 23 and 24. The coil 27 surrounds the inner legs of core members 8 and 9 and the coil 28 surrounds the inner legs of core members 14 and 15.

The coils 27 and 28 of the bias winding are arranged to produce magneto-motive forces in opposition to the magneto-motive forces of the reactance windings 8a, 9a, 14a and 15a and the coils 22a and 22b of the saturating control winding. The strength of the magneto-motive forces of the coils 27 and 28 is such as to neutralize the magneto-motive forces produced by the reactance coils 8a, 9a, 14a and 15a when the current in the control winding coils 22a and 22b is zero. This materially increases the range of control of the device because the unidirectional flux in the core members which is produced by the no load or maximum reactance current in the reactance windings 8a, 9a, 14a and 15a produces substantial saturation in the core members. Consequently, bucking out this no load saturating flux increases the reactance of the reactance windings at zero current in the control winding and correspondingly increases the reactive voltage drop across the reactance windings. As a result nearly all of the voltage supplied by the main secondary winding 2a is absorbed in the reactance windings and substantially zero voltage is supplied by either magnetic amplifier 6 or 7 to the load terminals.

With the foregoing understanding of the elements and their organization, the operation of the system will readily be understood from the following detailed description.

With the slider 26a in the mid-position, the current in the control winding coils 22a and 22b is zero. Consequently, the reactive voltage drops across the reactance windings 8a, 9a, 14a and 15a are maximum and the voltage supplied to the load terminals 3 and 4 is zero. Although each of the amplifiers 6 and 7 supplies a small voltage, these voltages are of opposite polarity at the load terminals and cancel each other. With zero voltage at the terminals 3 and 4, the motor 1 is at standstill. To accelerate the motor in the forward direction, the slider 26a is moved in a counterclockwise direction from its central or zero speed position. This causes current to flow in the conductor 30 in the direction indicated by the arrow 31 so that the magneto-motive forces produced in the core members 8 and 9 by the control winding coil 22a add to the magneto-motive forces produced by the reactance windings 8a and 9a and the magneto-motive forces produced in the core members 14 and 15 by the control winding coil 22b oppose the magneto-motive forces produced by the reactance windings 14a and 15a. As a result, the cores 8 and 9 become partially saturated, thereby reducing the reactive voltage drops across windings 8a and 9a and correspondingly increasing the voltage across the load terminals to accelerate the motor from rest. During one-half cycle of the alternating voltage, current flows from the left-hand terminal of the main secondary winding through reactance winding 8a, rectifier 10, resistor 13, bus 5 and armature of motor 1 to the center tap. During the succeeding half cycle current flows from the right-hand terminal of the secondary winding through reactance winding 9a, rectifier 11, resistor 13, bus 5 and armature of motor 1 to the center tap. Thus, the voltage at the bus 5 is positive during the forward operation. However, only a very small current is permitted to flow from positive bus 5 through resistor 19 and either of the rectifiers to the corresponding terminal of the secondary winding when it is negative owing to the voltage drop across resistor 19 which is supplied by the rectifier 21. The voltage across resistor 19 is positive at the bus 5 and consequently it bucks the voltage between bus 5 and the terminal of the secondary winding at which the voltage is negative. If a bucking voltage were not supplied in circuit with amplifier 7, the load voltage would be short-circuited by amplifier 7 because rectifiers 16 and 17 are of the wrong polarity to support a load voltage which is positive at terminal 4.

Since the magneto-motive forces produced by the control winding 22b oppose the magneto-motive forces produced by the reactance windings 14a and 15a, the reactive voltage drops across the reactance windings are maintained at maximum value and consequently the magnetic amplifier 7 supplies substantially zero voltage to the load terminals. Further rotation of the slider 26a in a counterclockwise direction increases the saturation of the core members 8 and 9 and increases the voltage supplied to the load terminals so that the motor 1 is accelerated to a speed corresponding to the position of the slider.

Return of the slider to the central zero speed position decreases the saturation of core members 8 and 9, thereby decreasing the voltage supplied to the load terminals and decelerating the motor to standstill.

The motor may be accelerated in the reverse direction by moving the slider 26a in a clockwise direction from its central position. This causes current to flow in the reverse direction in the saturating winding so that the magneto-motive force of coil 22b adds to the magneto-motive forces of the reactance windings 14a and 15a and the magneto-motive force of coil 22a opposes the magneto-motive forces of reactance windings 8a and 9a. As a result of this the saturation of the core members 14 and 15 is increased and that of the core members 8 and 9 is maintained at a minimum, with the result that the reactive voltage drops across reactance windings 14a and 15a are decreased while those across reactance windings 8a and 9a are maintained at maximum value. During the half cycle of alternating voltage in which the left-hand terminal of secondary winding 2a is negative, current flows from the center tap 2b through the armature of motor 1, resistor 19, rectifier 16, and reactance winding 14a to the left-hand terminal of the secondary winding. During the succeeding half-cycle current flows from the center tap, through the armature, resistor 19, rectifier 17 and reactance winding 15a, to the right-hand terminal of the secondary winding. Thus the voltage supplied to the load is positive at the terminal 3 and negative at the terminal 4. As the saturation of amplifier 7 is increased, the voltage supplied to the output terminals is correspondingly increased and the motor 1 is accelerated to a speed corresponding to the position of the slider.

During this reverse operation the voltage drop across the resistor 13 supplied by the rectifier 20, together with the voltage drop across reactance windings 8a and 9a, limits the current through the reactance windings and the resistor to a very low value. In other words, it prevents the amplifier 6 from short-circuiting the load voltage.

The amplifiers 6 and 7 supply both halves of the alternating voltage wave. For many applications satisfactory operation may be obtained from a modified form of the invention in which half wave rectified voltage is supplied to the load terminals. In this modification the rectifiers 11 and 16 and the core members 9 and 14, together with their reactance windings 9a and 14a, are omitted. Otherwise this half wave rectification modification is identical with the system of Fig. 1.

If the bias winding coils 27 and 28 were omitted, the amplifiers 6 and 7 would become partially saturated owing to self-excitation, i. e. excitation by the unidirectional currents flowing in the reactance windings. It may be assumed that they would become 50 per cent saturated. In other words, each amplifier would be turned half on. Thus amplifier 6 would supply half full load voltage plus the amount necessary to overcome the voltage drop across resistor 13. Similarly amplifier 7 would supply half full load voltage plus an additional amount to overcome the voltage drop across resistor 19. Since the two voltages are of opposite polarity, they cancel out and the voltage across the load terminals is zero and the motor is at standstill.

Movement of the slider 26a to the maximum speed position forward causes amplifier 6 to become fully saturated and amplifier 7 to become fully desaturated. As a result amplifier 7 would furnish zero voltage to the load terminals and amplifier 6 would furnish double full load voltage half of which would appear across the load terminals and the other half of which would be across resistor 13 opposing the voltage supplied by the rectifier. The motor would be accelerated to full speed in the forward direction. Similarly, movement of the slider 26a to the maximum speed position reverse would produce full saturation of amplifier 7 and complete desaturation of amplifier 6, with the result that the motor would be accelerated to full speed in the reverse direction.

This mode of operation produces higher gain of the amplifier than is obtained when the bias winding is used, although some efficiency is sacrificed.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A reversing control system comprising in combination a source of alternating voltage having a center tap, a first load terminal connected to said center tap, a second load terminal, forward and reverse magnetic amplifiers each comprising a core member provided with a pair of reactance windings, a connection including a voltage drop device from said second load terminal to corresponding terminals of each of the windings of each of said pairs, connections from the opposite terminals of the windings of each of said pairs to opposite terminals of said source, a separate rectifier in circuit with each of said windings, the rectifiers in circuit with one pair of said windings being poled oppositely to the rectifiers in circuit with the other pair of windings, means comprising a separate rectifier connected to each of said voltage drop devices for supplying to its corresponding voltage drop device a voltage opposite in polarity to the voltage drop produced by the currents flowing in said windings, and means comprising a source of variable direct voltage and a saturating winding supplied therefrom for simultaneously increasing the magnetization of one of said core members and decreasing the magnetization of the other of said core members.

2. A reversing control system comprising in combination a source of alternating voltage having a center tap, a first load terminal connected to said center tap, a second load terminal, a first magnetic amplifier comprising a core structure provided with two reactance windings each having a terminal connected to a different terminal of said source, a connection from the opposite terminals of said windings to said second load terminal, a second magnetic amplifier having a core structure provided with two reactance windings each having a terminal connected to a different terminal of said source and each having its opposite terminal connected to said second load terminal, a separate resistor in circuit between each of said pairs of windings and said second load terminal, means comprising separate rectifiers for supplying to said resistors voltages having opposite polarities at said second load terminal, a separate rectifier in circuit with each of said windings, the rectifiers in circuit with one of said pairs of windings being poled oppositely to the rectifiers in circuit with the other pair of windings, means for varying the voltage at said load terminals comprising a source of variable voltage and a saturating winding supplied therefrom and linking both said core members, and means for reversing the direction of current flow in said saturating winding to reverse the polarity of the voltage at said load terminals.

3. A reversing control system comprising in combination a source of alternating voltage having a center tap, first and second terminals adapted to be connected to a load circuit, a connection from said first terminal to said center tap, first and second magnetic amplifiers each comprising a core structure provided with a pair of reactance windings having terminals connected to opposite terminals of said source, a separate resistor connected between the opposite terminals of each of said pairs of windings and said second load terminal, a separate rectifier in circuit with each of said windings, the rectifiers in circuit with the windings of one of said pairs and the rectifiers in circuit with the windings of the other of said pairs being oppositely poled with respect to the terminals of said source, means comprising separate rectifiers for supplying to said resistors direct voltages of opposite polarity at said second load circuit terminal, means for varying the magnitude of the direct voltage at said load terminals comprising a saturating control winding linking said core structures, means for supplying a variable voltage to said control winding, and means for reversing the direction of current flow in said control winding to reverse the polarity of the voltage at said load terminals.

4. A reversing control system comprising in combination a source of alternating voltage comprising a transformer having a main secondary winding provided with a center tap and two auxiliary secondary windings, a first load circuit terminal connected to said center tap, a second load circuit terminal, first and second magnetic amplifiers each comprising a core structure provided with a pair of reactance windings, one of each of said pairs of said windings having a terminal connected to one terminal of said main secondary winding and the other having a terminal connected to the other terminal of said main secondary winding, a separate resistor connected between the opposite terminals of each of said pairs of windings and said second load terminal, a separate rectifier in circuit with each of said reactance windings, the rectifiers in circuit with one of said pairs of windings and the rectifiers in circuit with the other of said pairs of windings being oppositely poled with respect to the terminals of said secondary windings, means comprising a pair of rectifiers each supplied from a different one of said auxiliary secondary windings for supplying to said resistors direct voltages of opposite polarity at said second load terminal, means for varying the magnitude of the direct voltage at said load terminals comprising a saturating control winding linking said core structures, means for supplying a varying voltage to said control winding, and means for reversing the direction of current flow in said control winding to reverse the polarity of the voltage at said load terminals.

5. A reversing control system comprising in combination a source of alternating voltage comprising a transformer, said transformer having a main secondary winding provided with a center tap and two auxiliary secondary windings, a first load circuit terminal connected to said center tap, a second load circuit terminal, first and second magnetic amplifiers each comprising a pair of core members separated by an air gap and a pair of reactance windings one on each of said members, a separate resistor connected between said second load terminal and one terminal of each winding of said pair of windings, connections from the other terminals of the windings of said pair to corresponding opposite terminals of said main secondary winding, a separate rectifier in circuit with each of said reactance windings, the rectifiers in circuit with the windings of one of said pairs and the rectifiers in circuit with the other of said pairs being oppositely poled with respect to the terminals of said secondary winding, means comprising a pair of rectifiers each supplied from a different one of said auxiliary windings for supplying to said resistors direct voltages having a magnitude substantially equal to full load terminal voltage and having a polarity opposite to the polarity of the voltage supplied to the load terminals by the corresponding amplifier, means for varying the magnitude of the direct voltage at said load terminal comprising a saturating control winding linking said core members, and means for supplying a varying voltage to said control winding and means for reversing the direction of current flow in said control winding to reverse the polarity of the voltage at said load terminals.

WILLIAM L. O. GRAVES.

REFERENCES CITED

The following references are of record in the file of this patent:

UNITED STATES PATENTS

| Number | Name | Date |
| --- | --- | --- |
| 1,434,346 | Jonas | Oct. 31, 1922 |
| 2,276,752 | Willis | Mar. 17, 1942 |